United States Patent [19]
Ferriss

[11] Patent Number: 4,610,543
[45] Date of Patent: Sep. 9, 1986

[54] ELECTRONIC DITHER COMPENSATOR FOR A RING LASER GYRO

[75] Inventor: Lincoln S. Ferriss, Lincoln Park, N.J.

[73] Assignee: The Singer Company, Little Falls, N.J.

[21] Appl. No.: 719,856

[22] Filed: Apr. 3, 1985

[51] Int. Cl.$^4$ .............................................. G01B 9/02
[52] U.S. Cl. .................................................. 356/350
[58] Field of Search ......................................... 356/350

[56] References Cited

U.S. PATENT DOCUMENTS 4,480,915  11/1984  Arditty et al. ...................... 356/350

Primary Examiner—Eugene R. LaRoche
Assistant Examiner—D. C. Mis
Attorney, Agent, or Firm—Thomas W. Kennedy

[57] ABSTRACT

An electronic dither compensator for a ring laser gyroscope uses a velocity pickoff to eliminate the need for a differentiator following a displacement pick off in order to get a rate signal. The dither pickoff is converted, in a voltage to frequency converter, to a pulse train which is synchronized with the pulse train of the uncompensated input from the gyro detector. An automatic gain control with an amplitude control loop is provided. The pulses from the voltage-to-frequency converter and uncompensated inputs are synchronized and summed and differenced as selected by means of logic to produce gyro output pulses free from the effects of dither rate.

20 Claims, 12 Drawing Figures

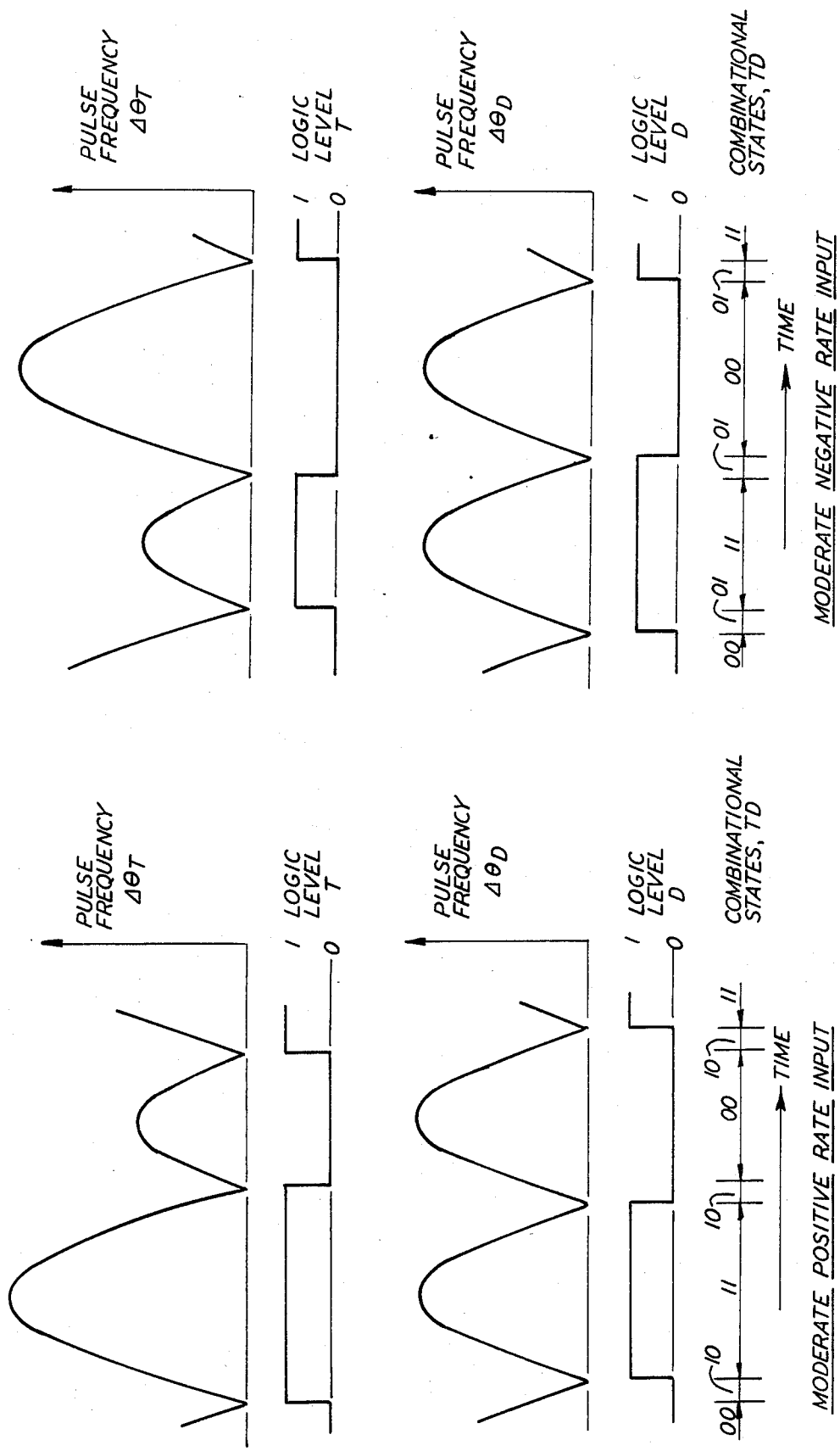

ELECTRONIC DITHER COMPENSATOR FOR A RING LASER GYRO

This invention relates to ring-laser gyroscopes in general and more particularly to an improved electronic dither compensator for a ring-laser gyroscope.

A dither compensator for use with mechanically dithered ring-laser gyroscope [RLG] which removes the dithering component of the mechanically dithered RLG from the total output leaving only that component proportional to the gyro case-referenced input rate is disclosed in U.S. Pat. No. 4,344,706. Outputs from a photodetector produce rotational data which is influenced by dither and by inertial rotation. A piezoelectric crystal is mounted within the body of the gyro and converts the dither angle to an electrical signal. Logic circuitry, including a tracking analog-to-digital converter operates upon the dither signal and the output from the beam combiner to subtract the effect of dither. Although that apparatus is quite workable, there are two areas which require complex electronic designs. These areas include the dither displacement pick-off and the tracking analog-to-digital converter.

The basic problem in regard to the pick-off transducer is that it is not easily implemented as the displacement pick-off required in the apparatus of the aforementioned patent but is readily usable as a velocity pick-off, which is required by the dither servo loop in its normal functioning. One particular system uses such a velocity pick-off, implemented with a trans-resistance amplifier. In implementation the apparatus of the aforementioned patent, a charge amplifier design was examined and built. Although not suitable for computer-controlled dither due to inherent low frequency response limitations, such an amplifier did meet the requirements of the apparatus of the aforementioned patent from the standpoint of gain and phase stability of the electronics. However, the actual transducer gain variation of plus or minus thirty percent or more are required to be within plus or minus 0.05 percent for the apparatus to perform well. One possible solution was the use of a strain gage transducer providing more predictable gains.

Tracking analog-to-digital converters meeting the requirements of the aforementioned patent were not commercially available. An experimental converter which would meet such requirements was designed and tested, but an extensive amount of electronics was required to be developed.

Thus, it is evident that there is a need for an improved electronic dither angle compensator which can be implemented in a more simple fashion.

SUMMARY OF THE INVENTION

The present invention provides such by making the following changes with respect to the apparatus of the prior art:

(a) the displacement pick-off, basically, an AC integrator in the prior art, is replaced with a velocity pick-off thereby eliminating the need for a differentiator following the integrator to provide the rate signal for the dither servo;

(b) the tracking analog-to-digital converter, basically a differentiator, is replaced with a voltage-to-frequency converter; and (c) an automatic gain control is added to eliminate errors due to transducer gain variation.

BRIEF DESCRIPTION OF THE DRAWINGS

FIG. 2 is wave-form diagram helpful in describing the compensator of FIG. 1.

FIG. 4 is a wave-form diagram similar to FIG. 2.

DETAILED DESCRIPTION OF THE INVENTION

RLG OUTPUT

The output frequency of a dithered ring-laser gyro without optical dither compensation is:

$$f_{(\Delta\theta)} = k_1 \, |\Omega_i + \Omega_d \sin\omega_d t| \tag{1}$$

where
- $k_1$ = gyro scale factor (pulse-rad$^{-1}$)
- $\Omega_i$ = case input rate (sec$^{-1}$)
- $\Omega_d$ = dither rate (sec$^{-1}$)
- $\omega_d$ = dither frequency (sec$^{-1}$)

The significance of the absolute value sign, is that on the first hand, the output frequency is indeed a real pulse train and, as such, can only exist in a positive sense. The polarity of the input rate, on the other hand, is indicated by the presence of output pulses on one of two lines, or, in another format, by the polarity of the logic signal on an up-down line.

EDC FUNCTION

The function of an electronic dither compensator (EDC) is to remove the dither rate component from the total gyro output on a pulse-by-pulse basis. The resultant output, a measure of gyro case input rate only, is available to the navigation computer at any time for rapid solution of the navigation equations, independent of dithering.

Basically, the EDC generates a pulse train from the dither velocity pick-off which is then subtracted from the total gyro output on a pulse-by-pulse basis. To facilitate complete removal of the dither component of input rate in light of gain variations of the dither rate transducer and pulse generator electronics, an automatic gain control (AGC) loop which nulls the frequency-modulated component of output of the EDC at the dither frequency can be included.

Figure 1:
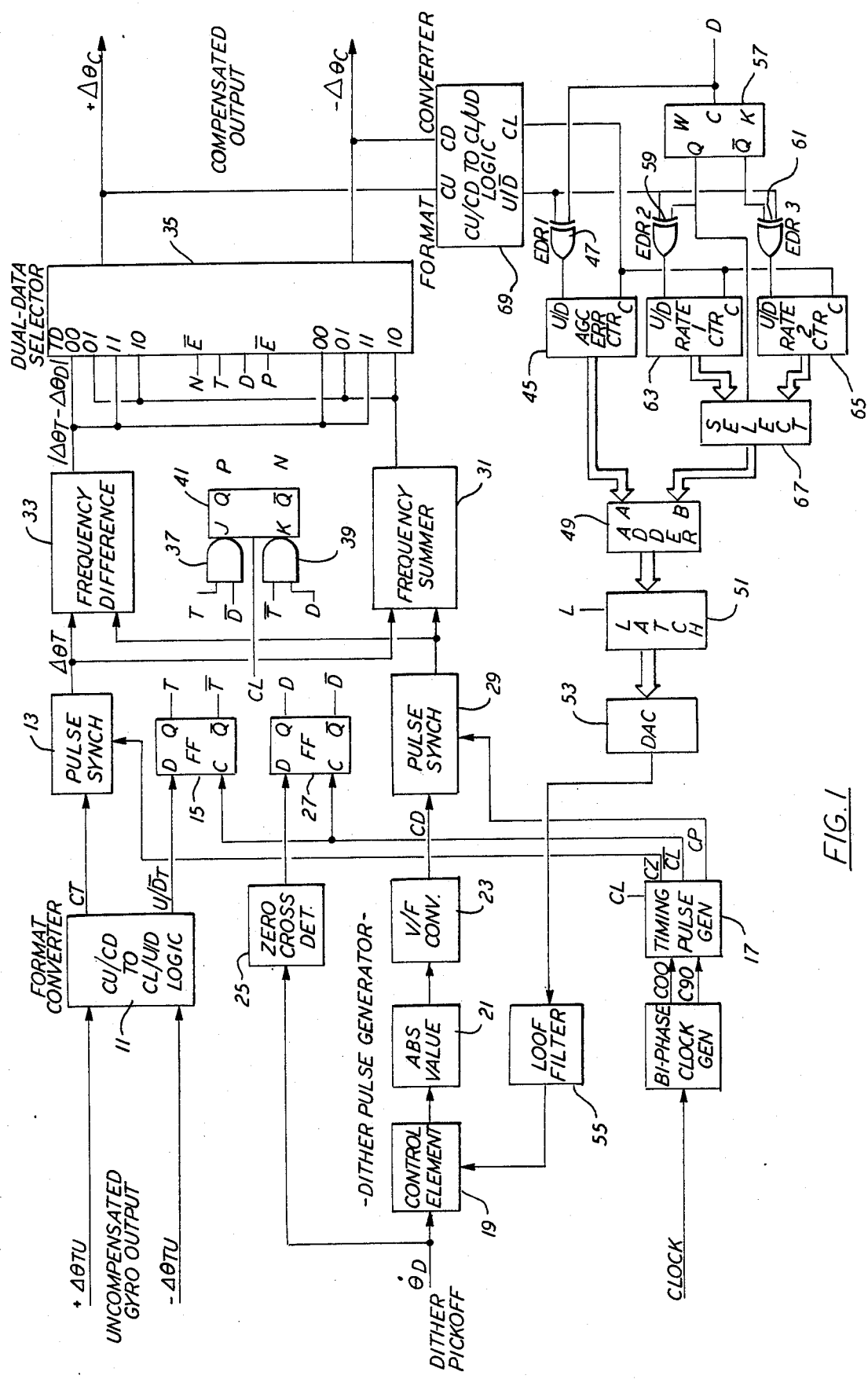
FIG. 1 is a block diagram of the electronic dither compensator of the present inventions.

The EDC of the present invention is illustrated in FIG. 1.

The uncompensated gyro output appears on a pair of lines, $\pm\Delta\theta_{TU}$. This clock-up/clock-down format is converted to a clock-toggle/up-down format in format converter logic 11 and synchronized to a fixed high-frequency clock rate in pulse synchronizer 13 which facilitates pulse-by-pulse processing in this mechanization.

All output pulses appear on the $\Delta\theta_T$ line while the sense is indicated by the logic level on the T line (1 = positive rate, 0 = negative rate) from a D-type flip flop 15 obtaining its data input from converter 11 and its clock input from timing pulse generator 17 which also supplies the synchronizing pulses to synchronizer 13.

The output of the dither pick-off is a voltage-analog of dither rate and is applied to a four-quadrant multiplier 19, used as an amplitude control element in the implementation of the AGC loop. The output of control element 19 is fed to absolute-value circuit 21, the output of which, in turn, is fed to voltage-to-frequency converter 23 which produces a pulse train, the frequency of which is proportional to dither rate, on the CD line. Dither rate polarity is identified by the logic level D (1 = positive dither rate, 0 = negative dither rate) which is derived from zero crossing detector 25 the output of which is coupled through D-type flip-flop 27. Pulse synchronizer 29 is used to synchronize pulse train CD with pulses from pulse generator 17 which also clocks flip-flop 27. Removal of the dither component of gyro rate from the total gyro rate is performed by the frequency summer 31 and differencer 33 in conjunction with logic levels T and D. A dual data selector 35 switches the proper outputs to the $\pm\Delta\theta_C$ compensated output lines.

The T and D outputs (and complements) of flip-flops 15 and 27 are fed to And gates 37 and 39 which provide input to a J-K flip-flop 41 providing outputs P and N. Logic signals, T, D, P and N are used to control selector 35. The way in which the type of processing (sum rate or differenc rate) is determined can be seen with the aid of FIGS. 2, 3 and 4. In FIG. 2 the pulse frequencies $\Delta\theta_T$ and $\Delta\theta_D$, and their polarity logic levels T and D are shown for an input rate $0 < \Omega_i < \Omega_d$. During the positive half dither period $\Omega_d$ and $\Omega_i$ have the same sense increasing the frequency $\Delta\theta_T$ to a peak value $k_1|\Omega_i + \Omega_d|$ whereas during the negative half dither period $\Delta\theta_T$ reaches a peak frequency $k_1|\Omega_i - \Omega_d|$. Near the bottom of the FIG. 2 are shown the dwell times of the four combinational states of logic variables T and D (shown as TD), three of which combinations are exercised for this input condition. The sequence is 00-10-11-10-00-10-... which is shown in the form of a flow diagram in FIG. 3. Each circle represents a combinational state of T and D and the arrows represent the transitions between states as the variables change logic levels. Consider a higher input rate where $\Omega_i > \Omega_d$. Variable T would always be a logic 1 and the sequence would revert to 10-11-10-11..., arrived at by removing combination 00 (which can't happen if T = 1).

Figure 3:
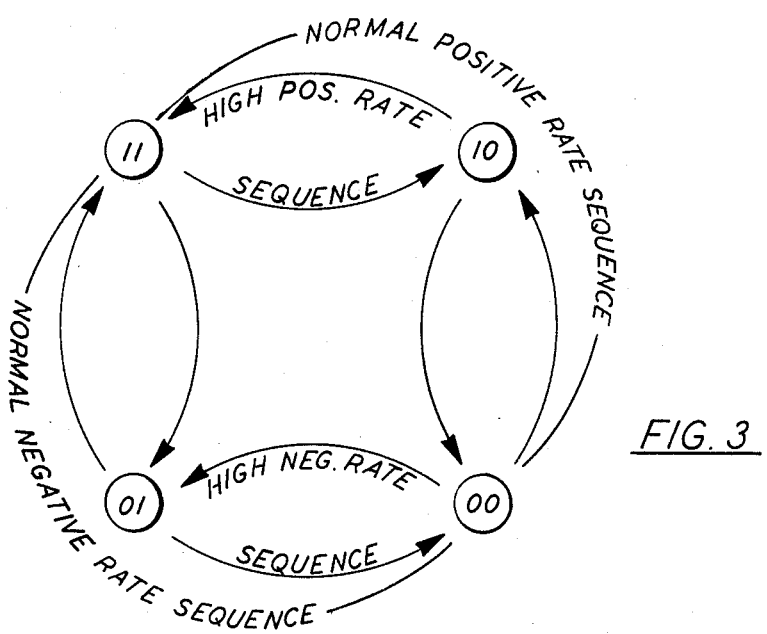
FIG. 3 is a sequencing diagram.

In a like manner, referring to FIG. 4, which shows the same waveforms as FIG. 2 for a moderate negative input rate, note that this produces a sequence 00-01-11-01-00-01... The high negative rate sequence reduces to 00-01-00-01, as combination 11 ceases to exist. A closer examination of FIG. 3 shows that states 00 and 11 are common to both positive and negative rates. Thus, inclusion of 10 in a sequence identifies a positive rate input and 01 a negative rate. Thus, J-K flip-flop 41 of FIG. 1 forms a rate polarity flip-flop and contains that information and enables the appropriate one of two data selectors for output on one of the two output lines.

An examination of FIGS. 2 and 4 suggests that for states 00 and 11 the output should be that of the frequency differencer, and for states 01 and 10, the output should be from the frequency summer. In terms of equation (1), $f_t > |k_1\Omega_i|$ for states 00 and 11 and therefore a frequency subtraction is required. The subtrahend is indeed $k_1\Omega_d \sin\omega_d t$. During states 01 and 10, $f_t < |k_1\Omega_i|$ and the augment $k_1\Omega_d \sin\omega_d t$ is required to yield a sum $f_t = |k_1\Omega_i|$.

AMPLITUDE CONTROL LOOP

The amplitude control loop functions to reduce the frequency modulation on the compensated output at the dither frequency to zero by controlling the gain of the dither pulse generator. Referring to FIG. 1, the outputs $\pm\Delta\theta_C$ are converted in a format converter 69 to a single pulse train CL and an up-down signal U/D. An AGC up down error counter 45 controlled by up-down output of converter 69 accumulates compensated output pulses, in the inverting sense during the positive dither half-period and in the non-inverting sense for the negative half-dither period. Stated another way the AGC error counter decrements with $+\Delta\theta_C$ pulses and $-\Delta\theta_C$ pulses increment the counter. This action is provided by the exclusive OR gate 47 which controls the up-down line of the counter. Thus, for an output rate constant over a dither period, the net contents of the counter sum to 0. If, however, a residual FM at the dither frequency is superimposed on that rate, the residual is in effect synchronously demodulated leaving a net count in the AGC error counter. The counter contents are coupled through adder 49 to latch 51 and then to digital-to-analog converter (DAC) 53. The action of the latch is to provide a fresh input to the DAC 53 at the end of each dither period. The DAC 53 output will tend to charge or discharge an integrator, part of a loop filter 55, which alters the control voltage input to the gain-controlling multiplier 19 in the dither pulse generator section of the EDC. The gain change effects a correction in the frequency of $\Delta\theta_D$, ultimately reducing the residual FM on $\pm\Delta\theta_C$ outputs to zero. When that condition has been achieved, the input to the DAC 53 is zero nulling the input to the integrator, thus maintaining that gain in the dither pulse generator which maintains the null of the dither FM on the $\pm\Delta\theta_C$ outputs.

ACCELERATION FEED FORWARD

This portion of the AGC loop is predicated upon constancy of output rate during the dither period, which is the case for most rate profiles to be encountered by the RLG. But under moderate angular accelerations, it is possible for the AGC error counter to accumulate net counts not resulting from residual FM at the dither frequency. Such a perturbation, if not accounted for, would tend to upset the AGC loop. To compensate this effect, a feed-forward loop discriminates between rate changes and residual dither FM, presenting at the the second (B) input of the full adder 49 a parallel binary word equal in magnitude but opposite in polarity to the change-of-rate component present at the A input from error counter 45, effectively subtracting out the effect of angular accelerations from the AGC loop. The circuit elements which comprise this loop 59 and 61 are a J-K flip-flop 57, a pair of exclusive OR gates, a pair of up-down counters 63 and 65 and a data selector 67.

Flip-flop 57 is clocked with the logic level D and produces a pair of square wave outputs at its Q and $\overline{Q}$ outputs which are alternately high for an entire dither period, then low for the next. The Q and $\overline{Q}$ outputs are exclusively OR'd with the up/down line from format converter 69, which causes rate counters 63 and 65 to alternately accumulate output pulses in the normal sense followed by accumulation in the inverted sense. Thus, for a constant rate output the counters are alternately incremented and decremented by the same amount producing zero change in counter contents. But if an acceleration component is present, each counter will alternately accumulate a count proportional to the change of rate which occurred over two dither periods. Counter contents are alternately connected to the B input of the adder where the change-of-rate component for the AGC error counter, present at input A in an inverted sense, subtracts out. Since the change-of-rate count scales by a factor of four greater in the rate counters than in the AGC counter, the parallel word presented to the B input of the adder is hard-wire shifted two places toward the LSB to effect a division by 4. Latching takes place at the end of dither periods followed by counter resets.

For proper operation, counters 45, 63 and 65 should be 16 bit counters and DAC 53 should be an 8 bit converter.

Figure 5A:
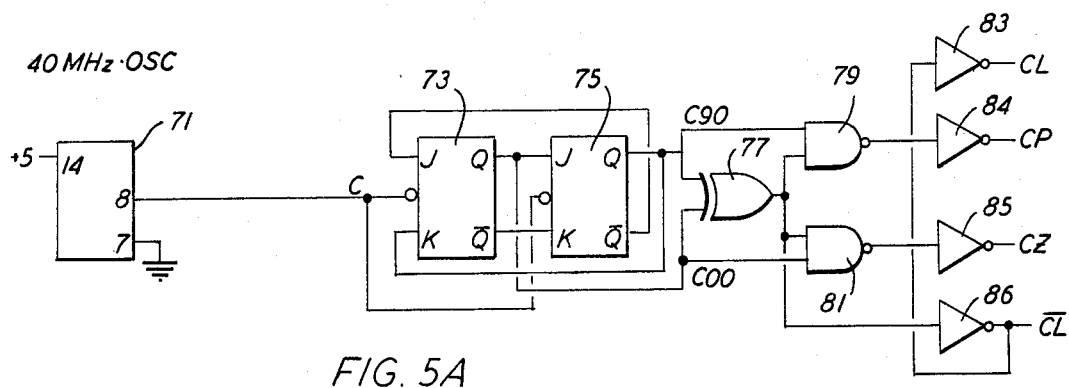
FIG. 5A is a logic diagram of the biphase clock generator of FIG. 1.
Figure 5B:
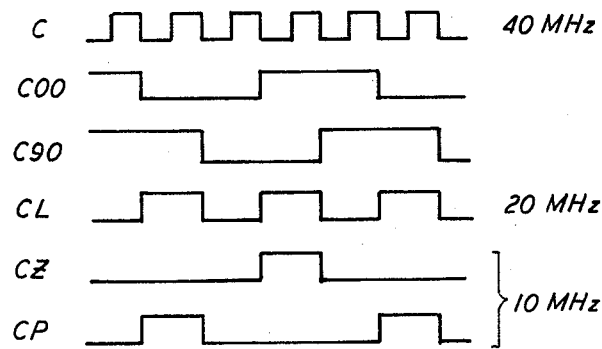
FIG. 5B is a timing diagram for FIG. 5A.
Figure 6A:
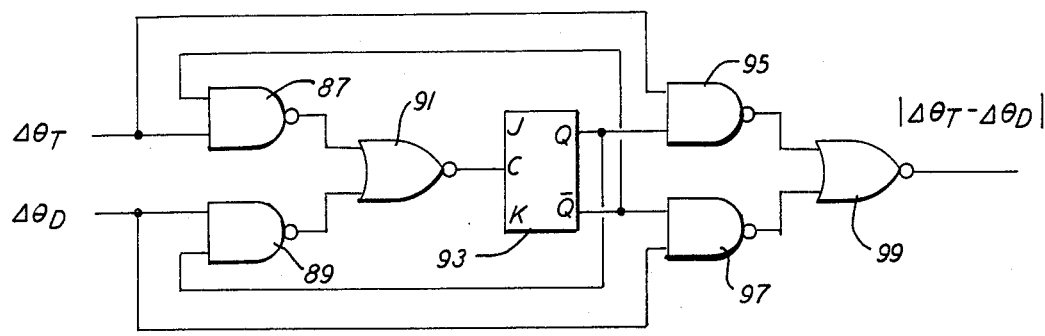
FIG. 6A is a logic diagram of the frequency differencer of FIG. 1.
Figure 6B:
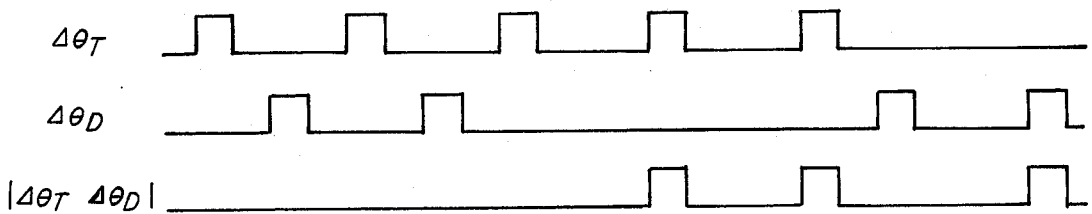
FIG. 6B is a timing diagram for FIG. 6A.

FIG. 5A shows the clock and timing pulse generator 17 of FIG. 1 and FIG. 5B the waveform it develops. Note the alternate and non-overlapping CZ and CP pulses which simplifies the frequency differencer (FIG. 6) and summer (FIG. 7). The output of a 40 MHz oscillator 71 is fed to a pair of J-K flip-flops 73 and 75. Flip-flop outputs are combined in exclusive OR gate 77 and NAND gates 79 and 81 to obtain the outputs which are buffered and inverted in inverters 83-86. As illustrated by FIG. 6, frequency differencer 33 includes NAND gates 87 and 89 having outputs coupled to a NOR gate 91 which is the clocking input of a flip-flop 93 having its output coupled to NAND gates 95 and 97 and back to gates 87 and 89. The final output is from NOR gate 99 having as inputs the outputs of gates 95 and 97. The waveforms of the circuit of FIG. 6A are shown in FIG. 6B.

Figure 7A:
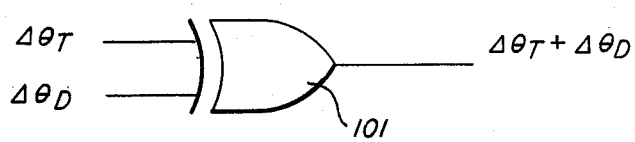
FIG. 7A is a logic diagram of the frequency summer of FIG. 1.
Figure 7B:
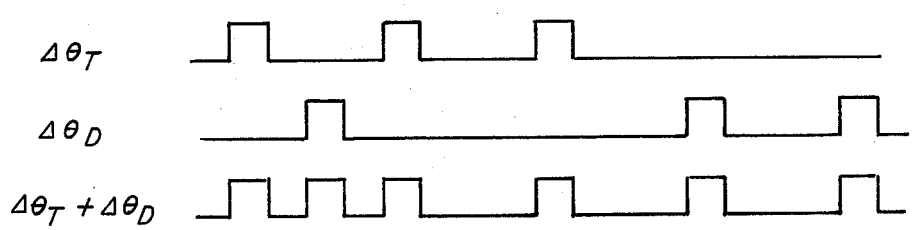
FIG. 7B is a timing diagram for FIG. 7A.

As shown by FIGS. 7A and 7B, the frequency summer comprises an exclusive or gate 101.

Figure 8A:
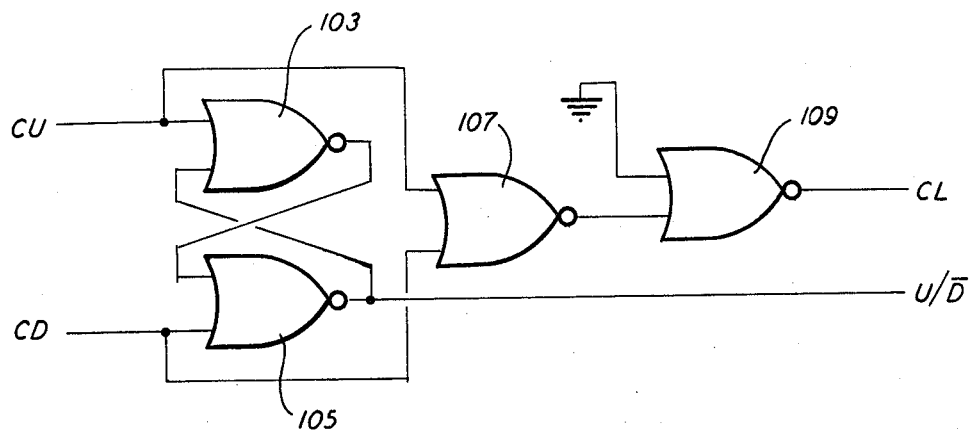
FIG. 8A is a logic diagram of the format convertor of FIG. 1.
Figure 8B:
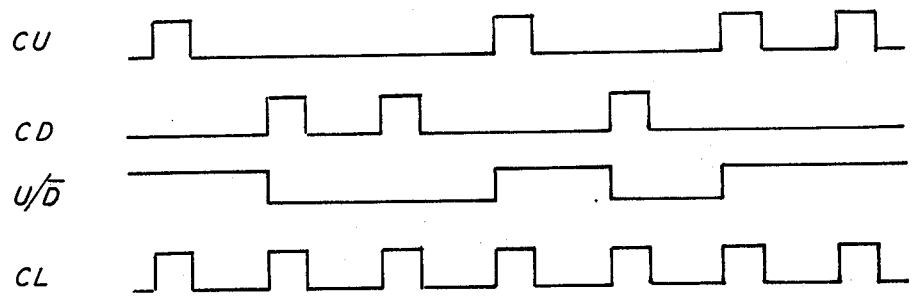
FIG. 8B is a timing diagram for FIG. 8A.

The circuitry for the format converters 11 and 69 is shown in FIG. 8A and its wave forms in FIG. 8B. It includes cross coupled NOR gates 103 and 105 to form the U/D output and NOR gates 107 and 109 (used as an inverter) to form the CL output.

What is claimed is:

1. In a dithered ring laser gyroscope having an uncompensated output indicative of rotation rate, the improvement comprising:
   (a) a velocity pickup for sensing dither;
   (b) an electronic dither compensator comprising:
      (i) an automatic gain control element receiving as an input the output of the dither pickoff and providing an output;
      (ii) a voltage-to-frequency converter having its input coupled to the output of said automatic gain control element providing an output pulse train proportional to dither rate; and
   (c) means to combine the output of said voltage-to-frequency converter with the uncompensated input from the gyro to remove the effect of dither on said uncompensated output.

2. Apparatus according to claim 1 wherein said means to combine comprises:
   (a) means to sum and means to difference the output of said voltage to frequency converter with the uncompensated input from the gyro and;
   (b) logic means for selecting one of the sum and difference output as a compensated output and provided it on an output line.

3. Apparatus according to claim 2, and further including an absolute value circuit between said control element and voltage-to-frequency converter.

4. Apparatus according to claim 3, and further including first means for synchronizing the uncompensated output and the output of said voltage-to-frequency converter.

5. Apparatus according to claim 4, wherein said first means for synchronizing comprise first and second pulse synchronizers through which said uncompensated output and said voltage to frequency connector output respectively are coupled and a timing pulse generator providing synchronizing inputs to said pulse synchronizers.

6. Apparatus according to claim 5, where said uncompensated input comprises first and second pulse trains one indicative of clockwise rotation and the other of counter-clockwise rotation and further including a first format converter for converting said two uncompensated outputs into a single pulse train and a logic signal indicative of up or down counting, said first pulse train being synchronized by said first pulse synchronizer and being provided as an input to said means to sum and difference along with the output said second pulse synchronizer.

7. Apparatus according to claim 6, and further including a zero crossing detector coupled to said dither pickup and second means for synchronizing the output of said zero crossing detector with the up/down output of said first format converter.

8. Apparatus according to claim 7, wherein said second means for synchronizing comprise first and second D-type flip-flops receiving data inputs from said format converter and zero crossover detector, respectively, and an output from said timing pulse generator for clocking said flip-flops.

9. Apparatus according to claim 8, wherein said means for selecting comprise:
   (a) means for decoding the outputs of said D-type flip-flops into an output indicative of a positive pulse train and an output indicative of a negative pulse train to indicate clockwise or counterclockwise rotation; and
   (b) data selection means having first and second selectors providing respectively first and second outputs corresponding to said positive and negative pulse trains, said first selector selected by an indication of a positive pulse train from said decoding means and said second selector by an indication of a negative pulse train by said decoding means, each selector having four inputs, two coupled to the output of said means to sum and two to the outputs of said means to difference, the one of the four inputs being provided at the output determined by the logic states of the outputs of said D-type flip-flops.

10. Apparatus according to claim 9, wherein said automatic gain control means comprises a four quadrant multiplier having as a first input the output of said dither pickoff and an amplitude control loop receiving inputs from the output of said data selection means and providing a second input to said four quadrant multiplier.

11. Apparatus according to claim 10, wherein said amplitude control loop includes:

(a) a format converter for converting the output of said data selection mean into a single pulse train and an up/down output;

(b) an automatic gain control up/down error counter with its up/down input enabled in response to said up/down output of said format converter and receiving its count input from the pulse train output of said format converter;

(c) means for latching the output of said error counter; and (d) a digital-to-analog converter receiving an input from said means for latching and providing an output to said multiplier.

12. Apparatus according to claim 11, and further including a loop filter between said converter and said multiplier.

13. Apparatus according to claim 12 and further including means to remove accelleration errors.

14. Apparatus according to claim 13, wherein said means to remove comprise first and second rate counters having up/down inputs enabled on alternate dither cycles to be controlled by the up/down output of said second format converter and receiving clock inputs from said second format converter; means for selecting the outputs of one of said rate counters as a circuit output on alternate dither cycles; and means for adding said rate counter output to said error counter output inteposed between said counters and said latching means.

15. Apparatus according to claim 14, wherein said means to difference comprise:

(a) a first NAND gate having as an input the uncompensated input frequency (b) a second NAND gate having as an input the output of said voltage to frequency converter;

(c) a NOR gate having as inputs the outputs of said first and second NAND gates;

(d) a flip-flop clocked by the output of said NOR gate having its uninverted output coupled as an input to said second NAND gate and its inverted output coupled as an input to said first NAND gate;

(e) a third NAND gate having as a first input said uncompensated pulse train and as a second input the uninverted output of said flip-flop;

(f) a fourth NAND gate having as a first input the output of said voltage to frequency converter and as a second input the inverted output of said flip-flop; and (g) a second NOR gate having as inputs the outputs of said third and fourth NAND gates.

16. Apparatus according to claim 15, wherein said means to sum comprise an exclusive OR gate having as first and second inputs said uncompensated pulse train and said output of said voltage-to-frequency converter.

17. Apparatus according to claim 16, wherein said format converters comprise:

(a) a pair of cross coupled NOR gates having as respective inputs the up pulse train and down pulse train and providing an output indicative of whether the pulse train is up or down; and (b) means for ORing said two pulse trains to provide a single pulse train.

18. Apparatus according to claim 17, wherein said means for ORing comprise a NOR gate having said two pulse trains as an input and an inverter at the output of said NOR gate.

19. Apparatus according to claim 2, wherein said frequency differencer comprises:

(a) a first NAND gate having as an input the uncompensated input frequency (b) a second NAND gate having as an input the output of said voltage to frequency converter;

(c) a NOR gate having as inputs the outputs of said first and second NAND gates;

(d) a flip-flop clocked by the output of said NOR gate having its uninverted output coupled as an input to said second NAND gate and its inverted output coupled as an input to said first NAND gate;

(e) a third NAND gate having as a first input said uncompensated pulse train and as a second input the uninverted output of said flip-flop;

(f) a fourth NAND gate having as a first input the output of said voltage to frequency converter and as a second input the inverted output of said flip-flop; and (g) a second NOR gate having as inputs the outputs of said third and fourth NAND gates.

20. Apparatus according to claim 2, wherein said means to sum comprise an exclusive OR gate having as first and second inputs said uncompensated pulse train and said output of said voltage-to-frequency converter.

* * * * *